Sept. 28, 1971

C. T. TUCKER 3,608,239

TREE POISON INJECTOR NOZZLE

Filed Dec. 16, 1968

CLAYTON T. TUCKER
*INVENTOR*

BY

*Robert K. Rhea*
AGENT

United States Patent Office 3,608,239
Patented Sept. 28, 1971

3,608,239
TREE POISON INJECTOR NOZZLE
Clayton T. Tucker, 3100 Vickie Drive,
Oklahoma City, Okla. 73115
Filed Dec. 16, 1968, Ser. No. 783,964
Int. Cl. B05b *1/28;* B27k *3/02*
U.S. Cl. 47—57.5                                                                1 Claim

ABSTRACT OF THE DISCLOSURE

A tree killing poison injector nozzle comprising a tube having a wedge-shaped end portion for entering a cut formed in a tree. The opposing sides of the wedge-shaped end are cut away to define an opening at each of its sides. A poison directing guard, surrounding the tube, forms laterally open channels lying in the plane of the wedge-shaped end.

BACKGROUND OF THE INVENTION

The present invention relates to tree and root killing tools and more particularly to a nozzle for injecting liquid poison into a tree.

A liquid poison is injected into a living tree or stump in measured quantities to be carried to all parts of the tree and roots by capillary attraction to kill the tree and promote deterioration of cellulose fibers. The caustic action of the chemical used requires that it be injected by a tool or tools. This is presently accomplished by a cylindrical container of tree poisoning chemical which contains a valve and plunger coaxially connected with an exhaust tube in turn connected with a nozzle for entering a cut formed in a tree. The nozzle is sometimes formed with a tree cutting edge. When the nozzle is inserted into the tree cut the cylindrical poison container is longitudinally moved toward the tree to actuate the plunger therein and dispense a quantity of the poison chemical. During such action with nozzles presently in use, some of the chemical is wasted by not being confined and directed into the cut formed in the tree.

This invention provides an improved type nozzle for confining the liquid poison during application to the confines of the cut formed in the tree thereby rendering the tree killing operation more economical by eliminating waste of the relatively expensive poison.

SUMMARY OF THE INVENTION

A tube is coaxially connected, at one end, to a cylindrical tree killing poison container dispensing outlet. The other end of this tube is flattened to form a wedge-shape and opposing sides of this flattened portion are cut away to form tear-drop shaped openings at opposing sides of the flattened portion adjacent its juncture with the remaining portion of the tube. A relatively thin shield is provided with an aperture medially its ends coaxially surrounding the tube. The shield is doubled back upon itself to flatly contact opposing sides of the flattened end portion of the tube which forms a channel for the respective teardrop shaped openings. The channels are open laterally and toward the flat free end of the tube so that chemical forced out of the teardrop openings is confined and directed toward the bottom of a cut formed in a tree.

The principal object of this invention is to provide an improved tree killing poison injector nozzle.

DESCRIPTION OF THE PREFERRED EMBODIMENT

Figure 1:
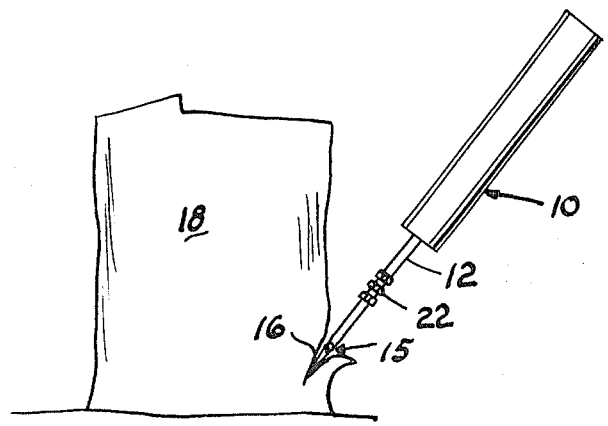
FIG. 1 is a side elevational view of the device in operative position during application of poison to the tree stump.
Figure 2:
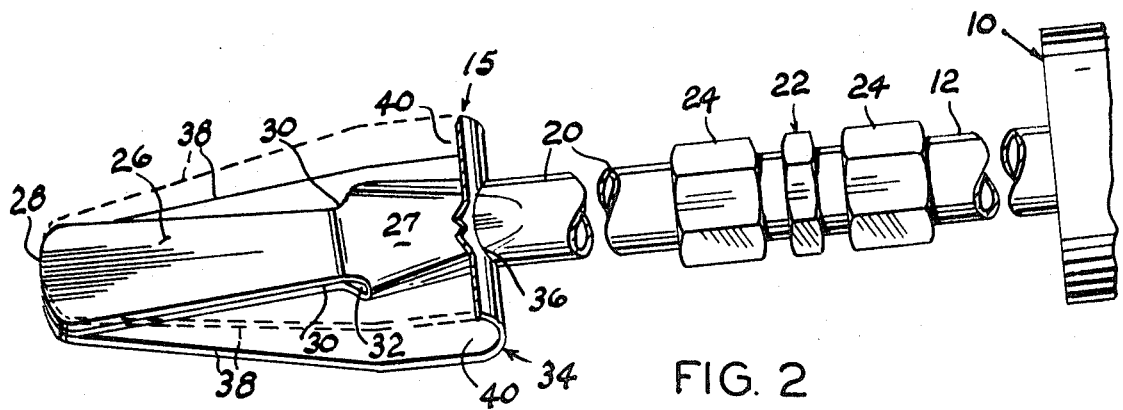
FIG. 2 is a fragmentary perspective view, to an enlarged scale, of the nozzle illustrating its construction and connection with a source of tree killing poison with parts of the shield broken away for clarity.
Figure 3:
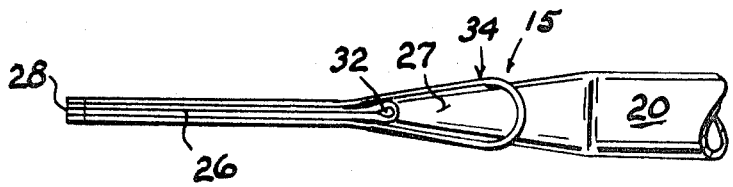
FIG. 3 is a fragmentary side elevational view of the nozzle.

Like characters of reference designate like parts in those figures of the drawings in which they occur.

In the drawings:

The reference numeral 10 indicates a cylindrical container commonly referred to as a Kane which contains a quantity of liquid tree killing chemical or poison. The Kane is provided with a valve and plunger, not shown, coaxially connected with a dispensing tube 12 so that when the container 10 is moved longitudinally toward the tube 12 a quantity of the chemical is discharged. The free end of the tube 12 is connected with a nozzle 15. The nozzle 15 is wedge-shaped so that it will enter a wedge-shaped opening 16 formed in the side of a tree or tree stump 18, thus, when the container 10 is moved toward the nozzle 15, with the latter being inserted into the cut 16, a measured quantity of the chemical is discharged into the cut 16.

The nozzle 15 comprises a selected length of tubing 20 which is coaxially connected at one end to the tube 12 by a connector 22 having ferrule and nut equipped end members 24 respectively surrounding and gripping the respective ends of the tubes 20 and 12 in sealing relation. The other or free end portion of the tube 20 is flattened, as at 26, and to form a wedge-shaped section 27 with the flattened end portion 26 terminating in a transverse arcuate end surface 28. Opposing sides of the flattened portion 26 are cut away, as at 30, to form an arcuate inwardly directed curve on opposite sides of the tube intermediate the length of its flattened portion to define mating ends of the tube in face to face contact and oppositely disposed teardrop shaped openings 32, only one being shown, which lie in the plane of the flattened portion 26 and face toward the free end 28 of the tube.

A shield 34, preferably formed by a length of relatively thin metallic plate material, having a transverse width substantially greater than the diameter of the tube 20, is provided with an opening 36, medially its ends, formed on a diameter substantially equal to the outside diameter of the tube 20 for coaxially receiving the tube 20. The length of the shield 34 is such that when its opening surrounds the tube 20 at the juncture of the wedge-shaped portion 27 with the remainder of the tube the free ends of the shield may be doubled back toward themselves in respective flat face to face contact with the tube flattened portion 26 and wedge-shaped portion 27 and are coextensive with the free end 28 of the flattened portion. Opposing side edges of the shield are beveled or tapered, as at 38, so that they converge toward the tube end 28. The shield 34 thus forms channel-like openings 40 on opposing sides of the flattened portion 26 for confining the chemical to the plane of the flattened portion 26 when forced out of the openings 32.

Operation

In operation the container 10 is connected with the nozzle 15. The cut 16 is formed in the tree stump by an axe, or the like, not shown. The nozzle end portion 28 is fully inserted into the cut 16 and the container 10 is manually forced longitudinally toward the nozzle 15 so that a quantity of the chemical is forced out of the teardrop openings 32. The chemical, being forced out of the openings 32 under pressure, tends to spray out of these openings. This spray is directed against the walls of the shield forming the channel-like openings 40 which confines the spray to the plane and area of the tree cut.

Obviously the invention is susceptible to changes or alterations without defeating its practicability, therefore, I do not wish to be confined to the preferred embodiment shown in the drawings and described herein.

I claim:

1. A tree poison injecting nozzle, comprising: an elongated tube having an inlet end adapted to be connected with a source of chemical poison and having its wall flattened to form an opposite wedge-shaped outlet end portion terminating in mating ends of the tube, said wedge-shaped end portion having inwardly directed recesses formed in its respective opposing sides intermediate the wedge-shaped configuration and defining teardrop-shaped openings facing toward and lying in the plane of said tube mating ends for entering a tree cut; and shield means confining poison ejected from the teardrop-shaped openings to the plane of said mating ends, said shield means comprising an elongated relatively thin plate having a transverse width greater than the diameter of said tube and having a central opening coaxially surrounding said tube at the juncture of the wedge-shaped end portion with the remainder of said tube, said plate being doubled back toward itself in overlying flatly contacting coextensive relation with respect to said tube mating ends forming laterally open channel like recesses on opposing sides of said wedge-shaped end portion communicating with the teardrop-shaped openings.

References Cited

UNITED STATES PATENTS

| | | | |
|---|---|---|---|
| 2,333,727 | 11/1943 | Lucas | 111—7.1 |
| 2,770,920 | 11/1956 | Little | 47—57.5 |
| 2,874,657 | 2/1959 | Austin | 111—7.1 |
| 3,040,680 | 6/1962 | McCluskey | 111—7.4 |
| 3,399,639 | 9/1968 | Enblom | 111—7.4 |

ROBERT E. BAGWILL, Primary Examiner

U.S. Cl. X.R.

21—73; 239—105, 288.5